Jan. 10, 1961 H. C. PEARSALL 2,968,024
SIGNALING MEANS FOR VEHICLES AND THE LIKE
Filed May 22, 1956 2 Sheets-Sheet 1
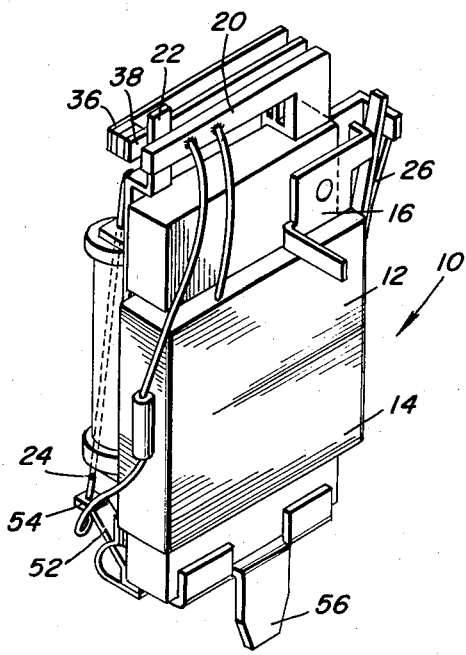
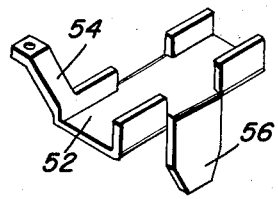
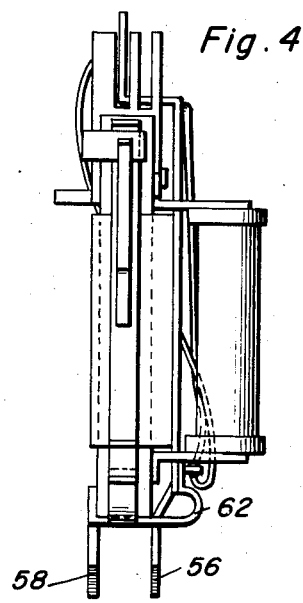
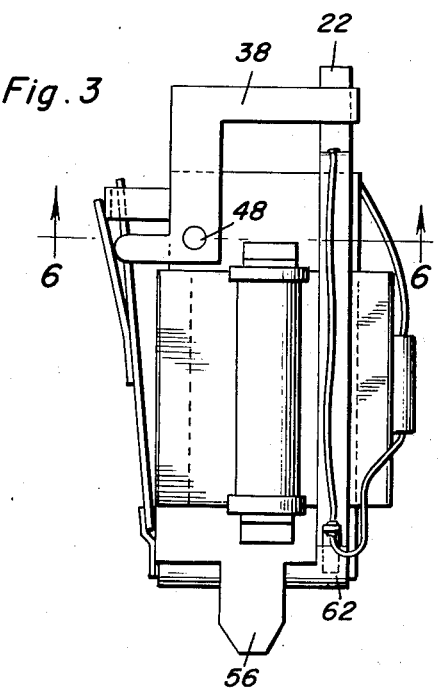
Harold C. Pearsall
INVENTOR.
BY Jan. 10, 1961     H. C. PEARSALL     2,968,024
SIGNALING MEANS FOR VEHICLES AND THE LIKE
Filed May 22, 1956     2 Sheets-Sheet 2

Harold C. Pearsall
INVENTOR.

United States Patent Office 2,968,024
Patented Jan. 10, 1961

2,968,024

SIGNALING MEANS FOR VEHICLES AND THE LIKE

Harold C. Pearsall, 4011 Curtis St., Houston, Tex., assignor of seventeen percent to Joel G. Pearsall, Sr., seventeen percent to Joel G. Pearsall, Jr., and sixteen percent to Bobbie J. Pearsall, all of Houston, Tex.

Filed May 22, 1956, Ser. No. 586,465

5 Claims. (Cl. 340—81)

This invention relates to the class of electrical switching apparatus and more particularly to a signal switch for use on vehicles and the like.

The primary object of the present invention resides in the provision of a thermo-responsive electric switch which is adapted to be utilized in a dual purpose signaling device which is efficient in function, economical in design and readily manufactured so as to achieve wide use and distribution.

A further object of the present invention resides in the provision of a thermo-responsive electric switch for alternating periodically the effective current through a signal circuit so as to make the signal light flicker or coruscate in brilliancy on the same circuit.

A further object of the invention is to provide a thermo-responsive electric switch adapted to be placed in a five prong electronic type tube female connector or related connectors.

A still further important object of the invention resides in the provision of a device having circuits and contact points so arranged that when a second condition is set into operation, the current flux or intensity will oscillate from one circuit to the other automatically.

An additional object is to provide a signal device of simple and practical construction which incorporates the relative action of a condenser, expansion and contraction of a resistance wire, resilient members, and contact arms and points.

These, together with the various ancillary objects and features of the invention which will become apparent as the following description proceeds, reside in the provision of this signal switch for vehicles, the present embodiment of which has been illustrated in the accompanying drawings, by way of example only, wherein:

Figure 1 is a perspective view of the thermo-responsive signal switch comprising the present invention with the envelope therefor removed;

Figure 2 is a perspective view of the adapter utilized in conjunction with the present invention;

Figure 3 is a rear elevational view of the signal switch;

Figure 4 is a side elevational view of the invention;

Figure 5:
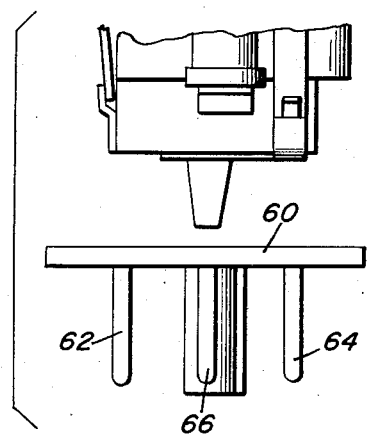
Figure 5 is a partial elevational schematic view illustrating the manner in which the adapter utilized as part of the present invention fits into the pronged base of the envelope.

With continuing reference to the accompanying drawings wherein like reference numerals designate similar parts throughout the various views, reference numeral 10 is used to generally designate the thermo-responsive switch comprising one of the important elements of the present invention. This switch is constructed so that the alternation of current may occur at regular intervals based on the relative coefficient of expansion of a resistance member and the bending of a contact point against a resilient member. The invention has three dependent circuits, the first of which is used to signal either a right hand turn or a left hand turn. Another circuit is used in conjunction with one of the first set of circuits to cause a light source to flash from the first set of circuits to the third set automatically. It is used as a distress signal, primarily indicating that the object is an obstruction standing still. In other words, functionally it will cause the tail lamps on a motor car to light up and flicker.

Figure 8:
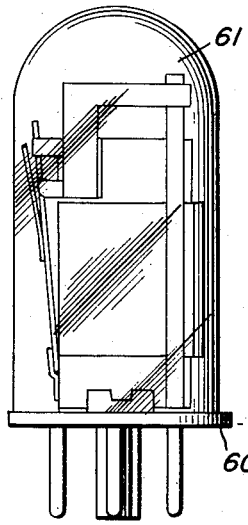
Figure 8 is an elevational view of the invention shown in the envelope.
Figure 9:
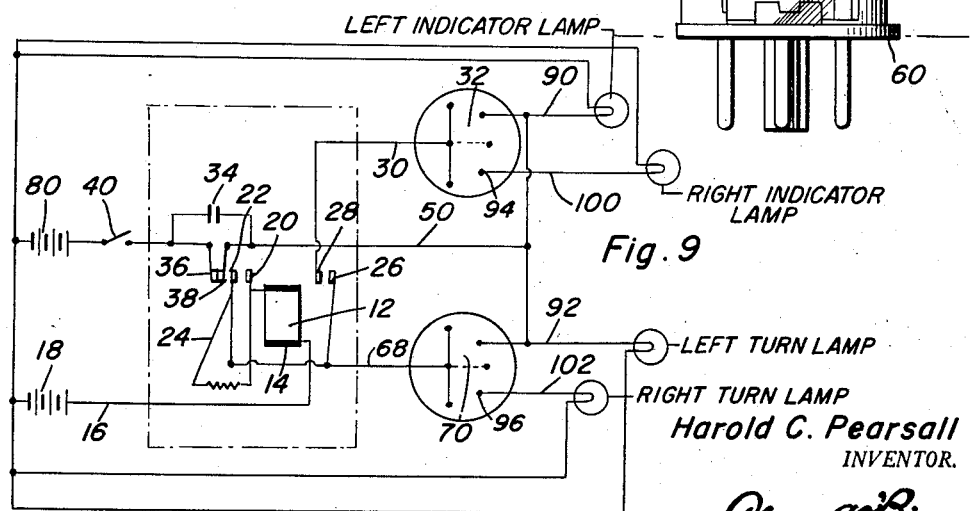
Figure 9 is a schematic wiring diagram illustrating the component parts of the invention in combination with other elements of a switch system adapted to be utilized on a vehicle.

Referring now more particularly to Figures 1 and 8, reference numeral 12 designates an electromagnet which is energized by passing current through coils 14 which are connected to the lead 16 and to battery 18. The coil 14 is electrically operatively connected to contacts 20 and 22 and to a resistance wire 24 which is adapted to change in size upon energization due to the heat. The resistance member 24 is normally held in tension by the contact arm 22. Contact 26 has a tendency to coalesce towards contact 28 when the electromagnet 12 is energized.

Contact 28 is wired to relay current to the lead 30 and thence to switch assembly 32. Contact 20 receives current from coil 14 and passes a small amount of current through the resistance coil 24 and contact member 22.

When contact 24 expands it allows contact 22 to engage contact 20 and contact 26 will engage contact 28. This eliminates the resistance element 24 from the circuit and the signal lights will receive full brilliancy and the magnetic attraction will be at a maximum. In the meantime, the resistance member 24 is allowed to cool, thus permitting the resistance element 24 to return to its original length and this, in turn, will pull and partly break the electric circuit between contacts 20 and 22 thus causing a fluctuation in the current received by the electric lamps of the circuit.

A condenser 34 is used to arrest sparking or possible fusing between the contacts 36 and 38 and in its normal condition before the coil 14 is energized, resistance element 24 is taut enough to keep members 36 and 38 closed, thus forming a closure for circuit #3.

A switch 40 may be located in the steering column which may be controlled by the emergency brake as desired. When the emergency brake is on and the device is in its neutral condition, this switch completely closes the third circuit of the system.

Figure 6:
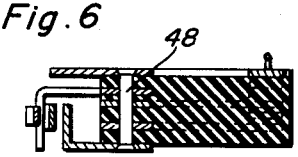
Figure 6 is a sectional detailed view as taken along the plane of line 6—6 in Figure 3.

It is noted that the back side of contact member 22 is provided with an insulator and the spaces of contacts 36 and 38 are separated by a hard fibre insulator, see Fig. 6. This insulator may be held in place by a suitable rivet or any other suitable means of fastening, the rivet being shown at 48 and may be of insulative substance itself.

Conductor 50 is a bypass lead to both light sources and obviously is energized when the switch 40 is closed and the contacts 36 and 38 are closed.

A member 52 is provided and has the function of having its upper part act as a leverage arm for resistance element 24 to act upon contact member 22. The member 52 which can be the base 52 besides having the upwardly extending arm 54 to which the member 24 is attached also includes two prongs pointed downwardly and indicated at 56 and 58 which aids in fastening the switch unit to its base 60. An envelope 61 is provided for the switch unit 10 and is bonded to base 60.

Figure 7:
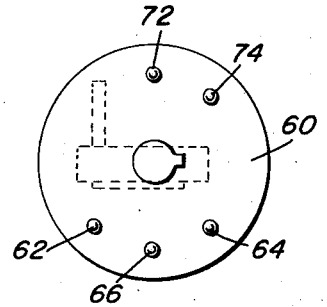
Figure 7 is a bottom plan view of the envelope.

Referring now to Figures 5, 7 and 8, it is noted that the base 60 is provided with a plurality of lead prongs. Prong 62 is a lead prong connected to the contact member 28. This prong may be connected to a switch in the steering column or brake pedal such as switch 32. Prong 64 is connected to the bypass conductor 50 and the brake operated switch 40. Prong 66 is connected to the conductor 68 leading to the switch 70 also in the form of a steering column control switch similar to the switch 32 and functioning therewith. Contact 72 is adapted to provide means for connecting the conductor 16 to the battery 18 while contact 74 is connected through the bypass conductor 50 and the switch 40 and provides connection to the battery as indicated at 76.

In use, the invention functions as follows. Assuming the signal unit is in a position where the coils 14 are not energized and with the switches 70 and 32 in a neutral position, and with the entire signal unit 10 in a neutral position, contacts 36 and 38 are closed and held in this position by tension in the member 24 exerted against the contact arm 22. If switch 40 is closed and the signal unit 10 and the switches 32 and 70 are in a neutral position, there will be a constant flow of current into conductors 90 and 92.

If switches 32 and 70 are closed, for example, to the left turn position as indicated at 94 and 96, and the switch 40 is open, the current will flow from the battery 18 through the coil 14, then through the resistance unit 24 and through the leads 100 and 102 in a small amount at first, but when the resistance unit 24 expands, due to heat generated by the current therein, contact member 22 will be forced against contact 20 by spring action contained in the contact arm 38 and with the help of the electromagnet 12.

Since contacts 20 and 22 are closed at this point, the resistance wire 24 is eliminated from the circuit and allowed to cool. This cooling action will have a tendency to make the resistance element 24 shrink, thus setting up tension of sufficient quantity to pull the contact 22 away from the contact 20. If the switch 40 remains closed and switches 32 and 70 remain in the position in engagement with the contacts 94 and 96, and with the switch 40 open, the operation will still continue the cycle automatically.

If the switch is closed to a position so as to engage conductors 90 and 92, and the switch 40 is open, the action will be the same as the paragraph immediately above with the exception that the current flowing from the battery 18 will go to leads 90 and 92 instead of leads 100 and 102.

If switches 32 and 70 are in the position so as to engage contacts 94 and 96 and the switch 40 is closed, the signal unit 10 is thoroughly energized by the current flowing from the battery 18 to the conductors 100 and 102 and from the battery 80 to the conductors 90 and 92. The contacts 22 and 22 will open and close automatically into the functioning of the resistance element 24 and therefore the insulated back side of the contact arm 22 will strike against the contacts 38, thus forcing contacts 38 and 36 to close while contacts 20 and 22 will be momentarily opened.

If the switches 32 and 70 are in position so as to complete a circuit to the conductors 90 and 92, there will be a constant flow of current to the conductors 90 and 92.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A signalling device for use on vehicles or the like including a source of electrical energy, a first circuit connected thereto and including a pair of contacts, means for biasing said contacts to a normally open position, a thermo-responsive resistance element connected between said contacts, said contacts being closed upon heating of said thermo-responsive element so as to form a shunt therefor, a plurality of indicators responsive to electric current connected in said circuit, switching means for selecting one of said indicators, the selection of an indicator closing said circuit and starting operation thereof whereby said thermo-responsive element alternately opens and closes said contacts whereby the current flowing through said indicator alternates between a high value and a lower values, a second circuit connected to said source including a second switch for opening and closing said second circuit and a second pair of contacts, said second circuit being connected to one of said indicators, means for biasing said second pair of contacts to a normally closed position, means for alternately closing and opening said second pair of contacts so as to vary the current through said indicator, the selection of one of said indicators other than the one connected to said second circuit and the closing of said second switch causing current to flow in both of said circuits whereby said two indicators alternately receive electrical current varying between a high value and a low value.

2. The signalling device of claim 1 further characterized in that said first biasing means biases said second pair of contacts to a closed position.

3. The structure of claim 2 further characterized in that said first pair of contacts and said second pair of contacts are relatively positioned such that when said first pair of contacts are biased to the open position, one of said first pair of contacts is in contact with said second pair of contacts and biases said second pair of contacts to a closed position, there being insulation placed between said one of said first pair of contacts and said second pair of contacts.

4. The structure of claim 1 further characterized by an electro magnet and a third circuit, said third circuit including a pair of normally open contacts adapted to be closed by said electric magnet, said electro magnetic being connected in said first circuit whereby the shunting of said thermo-responsive element allows sufficient current to flow through said electro magnet to close said third set of contacts, said third circuit further including a plurality of indicators responsive to electric current, a third switching means for selecting one of said indicators, said third switching means and said first switching means being operable simultaneously whereby the selection of indicators closes said first and third circuits and starts operation thereof.

5. The structure of claim 4 wherein said second pair of contacts operate alternately with said simultaneously operating first and third set of contacts.

References Cited in the file of this patent

UNITED STATES PATENTS

| 1,980,037 | Chase | Nov. 6, 1934 |
| 2,321,803 | Falge et al. | June 15, 1943 |
| 2,639,345 | Sitzer | May 19, 1953 |
| 2,673,937 | Hollins | Mar. 30, 1954 |
| 2,674,730 | Klebanoff et al. | Apr. 16, 1954 |
| 2,706,808 | Hollins | Apr. 19, 1955 |